United States Patent [19]

Chapman et al.

[11] Patent Number: 5,270,695
[45] Date of Patent: Dec. 14, 1993

[54] REDUCTION TECHNIQUE FOR DISPLAY OF A RADIOGRAPHIC IMAGE

[75] Inventors: James D. Chapman, Scottsville; Wayne W. Godlewski, Hilton, both of N.Y.

[73] Assignee: Eastman Kodak Company, Rochester, N.Y.

[21] Appl. No.: 800,669

[22] Filed: Nov. 27, 1991

[51] Int. Cl.⁵ .................................................. G09G 1/06
[52] U.S. Cl. ...................................... 345/131; 345/115
[58] Field of Search ............... 340/731, 723, 799, 798; 382/47, 56; 395/139

[56] References Cited

U.S. PATENT DOCUMENTS

| | | |
|---|---|---|
| 4,428,065 | 1/1984 | Duvall et al. ................. 340/731 |
| 4,764,975 | 8/1988 | Inoue .............................. 382/47 |
| 4,794,531 | 12/1988 | Morishita et al. ............... 382/6 |
| 4,829,453 | 5/1989 | Katsuta et al. ................. 340/731 |
| 5,068,905 | 11/1991 | Hackett et al. ................. 382/47 |

*Primary Examiner*—Ulysses Weldon
*Assistant Examiner*—Doon Yue Chow
*Attorney, Agent, or Firm*—William F. Noval

[57] ABSTRACT

A radiographic imaging system including image storage for storing a plurality of radiographic images and a video display for displaying one or more radiographic images in a reduced format. The radiographic images are reduced for display by means of a decimation technique which achieves processing speed and good image resolution.

1 Claim, 1 Drawing Sheet

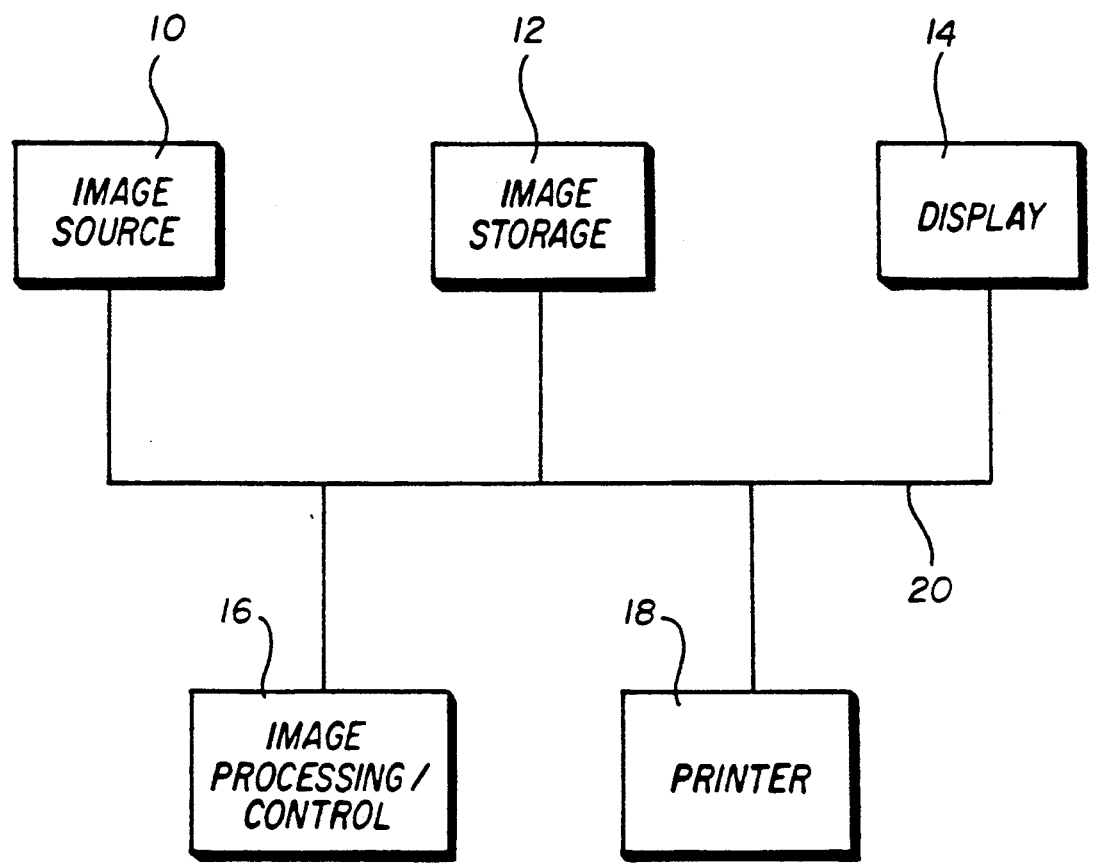

REDUCTION TECHNIQUE FOR DISPLAY OF A RADIOGRAPHIC IMAGE

TECHNICAL FIELD

This invention relates in general to the processing of digital images and, more particularly, to a technique for the reduction of a digital radiographic image for display on a video monitor.

BACKGROUND OF THE INVENTION

There is a need to provide radiologists and radiology technologists with the ability to retrieve radiographic images from magnetic or optical disk storage for review on a computer workstation and/or obtaining a film radiograph from a laser printer. It is desirable to provide the radiologist/technologist with the ability to view a facsimile of the radiograph on a video display prior to making a request that the radiograph be printed on film.

A radiograph will typically contain far more image information (referred to as pixels for picture elements) than can be displayed on even the most advanced video display devices. Consequently, to display the radiographic facsimile (in addition to other useful non-radiographic data) it is desirable to reduce the amount of radiographic pixel data to within the constraints enforced by the video display hardware being used.

Because this video radiograph facsimile will not be used for diagnostic purposes, the preservation of a diagnostic-quality image is not necessary. It is thus desirable to present a radiographic page which can be displayed in its entirety on the video display, while maintaining the identical format and aspect ratio as the radiograph which would be obtained from the laser printer. Moreover, it is also required that the radiologist/technologist be able to view any individual image contained within the radiograph at its full resolution.

SUMMARY OF THE INVENTION

According to the present invention, since the printed radiograph is usually compiled from more than one individual image composed into specific formats, the technique involves obtaining the format for the radiographic page being displayed, obtaining each of the images contained on that page, resolving the discrepancy between the actual resolution (the amount of available pixel data) of the images to be displayed and that which the video display will support, reducing each of the images to fit within the available space in the required format, and positioning each image at the proper coordinates on the video display.

According to an aspect of the invention, in order to be able to quickly display any of the individual images contained within the radiographic page, this technique takes advantage of an attribute within the windowing system used to display the images which allows any image to be displayed at full resolution if the operator were to select that specific image for viewing.

Preferably, the data files which contain the image information are created in an industry format (ACR-NEMA) which guarantees that all of the format and image size information required to successfully complete this process are contained with the header of each file.

BRIEF DESCRIPTION OF THE DRAWING

The only FIGURE is a block diagram of a radiographic imaging system incorporating the present invention.

DESCRIPTION OF THE PREFERRED EMBODIMENTS

Referring now to the FIGURE there will be described a radiographic imaging system including an embodiment of the present invention. It will be understood that the present invention is also applicable to other digital imaging systems where it is desired to display one or more images before reproduction in hard copy.

As shown in the FIGURE, a digital radiographic imaging system includes a digital image source 10, image storage 12, image display 14, image processing and control 16; image printer 18 and communication channel 20. Digital image source 10 can be a medical diagnostic imaging modality (such as a computed tomography (CT) modality, a magnetic resonance imaging (MRI) modality, an ultrasound (US) modality, a digital subtraction angiography (DSA) modality), a radiographic film digitizer, or a computed radiography (CR) system (in which a digital image is read from a latent radiographic image stored in a storage phosphor). Image storage 12 can be any digital storage device (optical disk or tape, magnetic disk or tape, solid state) which is capable of storing a number of digital diagnostic images. Image processing and control 16 is a digital computer (such as a microprocessor). Image display 14 is a video monitor (LCD, CRT). Printer 18 is a radiographic printer (laser, electrophotographic, thermal, CRT) which produces one or more digital images on hard copy (film, paper). Communication channel 20 can be a bus connecting all or some of the devices and can include transmission channels (such as microwave, cable, satellite).

In operation, digital radiographic images from source 10 are stored in image storage 12. One or more digital images can be reproduced on film by printer 18. Prior to printing it is desirable to display the images on display 14, as they will appear on the final print. Because the displayed images may have reduced resolution due to the resolution of display 14, according to the present invention a technique is provided for the reduction of the digital image by the elimination of pixels.

The process of mapping a full-resolution radiograph to a reduced-resolution facsimile for display consists of the following steps, which are subsequently expanded below:

Obtain the radiographic page format to be printed by printer 18 to determine the image layout on the page (in terms of rows and columns) and the full-resolution dimensions of each image on that page.

Using the information obtained above and the known dimensions of the video display 14 drawing area (on which the images will be displayed), determine in control 16 the dimensions and drawing area coordinates for each image to be displayed, and determine the factors by which each image must be reduced in order to fit within the display 14 image dimensions.

For each image being displayed, use the reduction factors calculated above to subsample the image's pixel data, causing enough pixel information to be discarded such that the resultant image will fit within its corresponding display 14 dimensions.

At each image coordinate calculated above, create an image window on display 14 into which will be written the image which resulted from the above-described subsampling algorithm.

Each image file from storage 12 contains ACR-NEMA compliant header information about the image in that file; one of those datum is the radiographic page format. The formats which this process supports describe pages containing 1, 2, 4, 6, 9, 12, 15, 16, 20, 24, 30, and 35 radiographic images. The layout of each format, in terms of rows and columns is shown in Table 1.

The dimension data (height and width of the image in pixels) is also contained within the header of each image file.

TABLE 1

| Radiographic Page Formats | | |
|---|---|---|
| Format | Rows | Columns |
| 1-up | 1 | 1 |
| 2-up | 2 | 1 |
| 4-up | 2 | 2 |
| 6-up | 3 | 2 |
| 9-up | 3 | 3 |
| 12-up | 4 | 3 |
| 15-up | 5 | 3 |
| 16-up | 4 | 4 |
| 20-up | 5 | 4 |
| 24-up | 6 | 4 |
| 30-up | 6 | 5 |
| 35-up | 7 | 5 |

The new image height is calculated by image processing and control 16 by dividing the total height of the drawing area by the number of rows of images determined above. Similarly, the new image width is calculated by control 16 by dividing the total width of the drawing area by the number of columns determined above.

Using the new height and width values calculated above, the coordinates for each image are determined as follows. Note that in the formats supported, every image on a specific radiographic page has identical dimensions.

Starting with coordinates (0,0):

For each column of each row increment the image's X coordinate by the amount of the image's width. Note that the first image of each row always has an X coordinate of zero. For each row of the format, increment the image's Y coordinate value by the amount of the image's height. Note that the images in the first row always have a Y coordinate of zero.

The reduction factors are determined as follows:

In control 16, divide the window dimensions of display 14 by the corresponding dimensions of the image. Use real number division so that the remainder is not truncated. Save the smaller quotient and the two dimension values which were used to arrive at that value.

If the quotient is greater than or equal to one, no reduction is necessary. Otherwise, in control 16 repeat the following steps until the image dimension is less than or equal to the corresponding window dimension: 1) Divide window by image dimension to determine the percentage of the image to be retained, 2) subtract result from one to determine percent of image to be thrown away, 3) take the inverse of that value, add 0.999999 to the result, and convert it to an integer value (truncating the fractional component). This will produce a whole number value which represents the number of pixels/lines to be examined at a time, dropping one pixel/line each time, 4) Multiply the image dimension by the quotient of this new value −1 divided by the new value.

Example: image_dimension = 524, new_value = 8
image_dimension = image_dimension *
(new_value − 1)/new_value 5) With each iteration, save the new value which is calculated: it will be used during the corresponding pass in the actual decimation process described next.

An adjustment value is applied to the last two passes to assure that the resulting image will fit within the window dimensions. This adjustment is not required as the number of iterations in the above process increases, but as the number of iterations increases, the decimation process outlined below becomes more complex.

The decimation algorithm had to emphasize performance while also maintaining image quality. Without doing pixel averaging, the best image quality is obtained by passing through the image several times, throwing away one pixel/line at a time in predetermined intervals. However, passing through the image more than once is time-consuming, which is unacceptable if fast processing is needed.

Using the reduction factors calculated above, in control 16 a multiple-pass decimation can be simulated while actually examining the image data only once. Each reduction factor calculated represents a virtual pass through the image. Because each value n represents the pixel/line out of n pixels/lines which will be thrown away, reduction is a matter of recognizing when that element is reached, and ignoring that element. For each pass a counter in control 16 is used for lines and pixels, and at each iteration the counter is tested by using the modulo of the counter and the reduction value for that pass. If there is a remainder, the pixel/line is saved, otherwise it is dropped.

This method works well at preserving image quality, but requires enhancement to increase performance. Reducing the occurrence of modulo operations for each pixel within a line causes the algorithm to perform much more efficiently. Because positionally the same pixels will be dropped from every line, the pixels to be dropped can be calculated once and that information saved and reused during each iteration through the image. The information is saved in a one-dimensional array containing one element for each pixel in the image line. A pass through one line is simulated, using the modulo operation on each element with the reduction factors, and each element of the line which is to be saved is marked in the array (see FIG. 1). When the actual image data is being processed, the corresponding value of the array is examined to determine whether a pixel should be saved; this comparison is much faster than a modulo operation.

TABLE 2

| Program In C Language |
|---|
| /*set the pixel map elements for the pixels being saved */<br>col1 = col2 = col3 = col4 = 1<br>index = 0;<br>while (col1 <= image_width<br>{<br>  if (col1 % first_pass_pixels)<br>  {<br>    if (col2 % second_pass_pixels)<br>    {<br>      if (col3 % third_pass_pixels)<br>      {<br>        if (col4 % fourth_pass_pixels) |

TABLE 2-continued

Program In C Language

```
            pixel_map[index] = 1;
          col4++;
        }
        col3++;
      }
      col2++;
    }
    col1++;
    index++;
  }
```

Critical to the efficiency of this process is the one-to-one association between each decimated image and a unique drawing area window on display 14. One window area is created within the drawing area at each of the image coordinates calculated above; the dimensions of each window match the dimensions calculated above as well. Although there will always be sufficient windows created to allow for the quantity of images called for by any particular radiographic page format, it is not a requirement that each window contain an image any more than it is a requirement that each position on a radiograph contain an image.

In addition to radiographic page format and image dimension information, the ACR-NEMA header of each tile contains the image position. Positions begin with position one. Using the position value for an image, its image data is written into the window of the drawing area which corresponds to that position. This is done for each image associated with the radiographic page being displayed.

Industrial Application and Advantages

The invention has application in radiographic imaging systems. It has the following advantages:

1. Because of the requirement for speed, decimation methods which were calculation-intensive, such as pixel averaging, are disadvantageous. This invention is measured against a prototype which displays radiographic pages at reduced size very quickly. The invention operates at comparable or better speed. On the other hand, some of the faster algorithms, such as whole number reduction or dropping several pixels at a time resulted in poor quality images. The invention outlined above solves both the problems of speed and image quality.

2. It has been mentioned above that there is a requirement that the radiologist/technologist be able to quickly obtain a full-resolution display of any single image within the currently displayed radiograph. By building separate windows for each image on the radiographic page and decimating each image separately, the invention is able to take advantage of the window system with which the video display functionality was developed. The window system toolkit permits a callback procedure to be associated with each window that is created which effects the immediate display of a full resolution image of whichever decimated image the radiologist/technologist selects with the mouse pointer device. This approach is considered advantageous over the alternative:

Display a single image of the radiograph in the drawing area which contains a concatenation of the individual images.

Use the mouse pointer coordinates, the radiographic page format, and the drawing area dimensions to determine the position of the image which was selected.

Use the image position to determine which image to display.

In addition, building individual decimated images rather than a single large image allows the conservation of valuable RAM resources when the radiograph being viewed contains empty image positions: memory has to be allocated only for the actual images on the radiograph rather than the equivalent of the entire drawing area.

Although the invention has been described with reference to preferred embodiments, it will be understood that variations and modifications can be effected within the spirit and scope of the invention as described above and as defined in the appended claims.

What is claimed is:

1. In a digital radiographic image system including storage means for storing digital radiographic image pages, wherein each digital radiographic image page has associated with it, (1) format information including number and layout in rows and columns of individual images constituting the image page, and (2) dimension information including the height and width in pixels of each said individual image and further including display means having a display area of predetermined height and width dimensions in pixels, a method of displaying on said display means in the same or reduced size, a digital radiographic image page from said storage means, said method comprising the steps of:

obtaining from said storage means the format information and individual image dimension information of a digital radiographic image page to be displayed on said display means;

from the obtained format information and dimension information of said digital radiographic image page and the predetermined dimensions of said display area of said display means, determining the display area dimensions and display area coordinates for each image to be displayed and the factors by which each image must be reduced in order to fit within the display area dimensions;

for each image being displayed, using the reduction factors determined in the last step to subsample each said image's pixel data, causing enough pixel information to be discarded such that the resultant image will fit within the corresponding display area dimensions;

at each display area image coordinate determined above, creating an image window having said display area dimensions on said display means for displaying each said subsampled image of said digital radiographic image;

wherein in said determining step, said reduction factor for each image of said digital radiographic image to be displayed is determined as follows:

dividing the window dimensions of said display means by the corresponding dimensions of said image by using real number division so that the remainder is not truncated;

from said dividing step, saying the smaller quotient and the two dimension values which were used to arrive at said quotient;

if said quotient derived from said dividing step is greater than or equal to one; no reduction of the image is necessary, and the image is displayed in said image window with said original dimensions;

if, on the other hand, said quotient derived from said dividing step is less than one, the following steps are repeated until the image dimension is less than or equal to the corresponding window dimension;

dividing the window dimension by the image dimension to determine the percentage of said image to be retained;

subtracting the result of said dividing step from one to determine the percent of said image to be thrown away;

taking the inverse of the value determined in said subtracting step, adding 0.999999 to said inverse, and converting the addend to an integer value by truncating the fractional component, said integer value representing the number of pixels or lines to be examined at a time, wherein one pixel or line is dropped each time;

with each iteration, saying the new value which is calculated;

using said saved values in said subsampling step.

* * * * *